United States Patent
Arndt et al.

(10) Patent No.: US 11,617,468 B2
(45) Date of Patent: Apr. 4, 2023

(54) FILTER CAPSULE FOR SECONDARY FILTRATION OF COFFEE AND USE THEREOF

(71) Applicant: WMF Group GmbH, Geislingen/Steige (DE)

(72) Inventors: Peter Arndt, Blaustein (DE); Johannes Bais, Ulm (DE); Denis Oberhansl, Munich (DE); Philipp Schirrmacher, Ulm (DE); Armin Startz, Weidenstetten (DE)

(73) Assignee: WMF GmbH

( * ) Notice: Subject to any disclaimer, the term of this patent is extended or adjusted under 35 U.S.C. 154(b) by 0 days.

(21) Appl. No.: 16/486,890

(22) PCT Filed: Feb. 15, 2018

(86) PCT No.: PCT/EP2018/053765
§ 371 (c)(1),
(2) Date: Aug. 19, 2019

(87) PCT Pub. No.: WO2018/149911
PCT Pub. Date: Aug. 23, 2018

(65) Prior Publication Data
US 2020/0229632 A1    Jul. 23, 2020

(30) Foreign Application Priority Data
Feb. 20, 2017   (DE) .................... 10 2017 202 685.5

(51) Int. Cl.
*A47J 31/06*     (2006.01)
*A23F 5/18*      (2006.01)
(Continued)

(52) U.S. Cl.
CPC ............. *A47J 31/0657* (2013.01); *A23F 5/18* (2013.01); *A47J 31/446* (2013.01); *B01D 29/31* (2013.01); *B01D 61/145* (2013.01)

(58) Field of Classification Search
CPC ...... A47J 31/0657; A47J 31/446; A47J 31/24; A23F 5/18; B01D 29/31; B01D 61/145;
(Continued)

(56) References Cited

U.S. PATENT DOCUMENTS 2,626,558 A    1/1953  Stein et al.
2,997,178 A *  8/1961  Lorimer ............... B01D 24/183
                                                    210/287

(Continued)

FOREIGN PATENT DOCUMENTS

CN    2732112 Y    10/2005
CN    2768621 Y    4/2006
(Continued)

OTHER PUBLICATIONS

International Search Report, issued in International Application No. PCT/EP2018/053765, dated Mar. 29, 2018, pp. 1-3, European Patent Office, Rijswijk, Netherlands.
(Continued)

*Primary Examiner* — Madeline Gonzalez
(74) *Attorney, Agent, or Firm* — Crowell & Moring LLP

(57) ABSTRACT

A filter capsule for secondary filtration of extracted coffee is provided, where the filter capsule comprises a housing and at least one filter element or consists thereof. The housing comprises a bottom, at least one side wall and at least one cover or consists thereof, the at least one filter element being disposed in an interior space of the housing. Coffee extracted on a brewing strainer can be subjected to a secondary filtration so that suspended particles and emulsified oils of a specific size are separated from the coffee by the filter (Continued)

element of the filter capsule and a new type of coffee is produced. The use of the filter capsule for secondary filtration of coffee is therefore proposed.

17 Claims, 7 Drawing Sheets

(51) Int. Cl.
*B01D 29/31* (2006.01)
*A47J 31/44* (2006.01)
*B01D 61/14* (2006.01)

(58) Field of Classification Search
CPC .................. B01D 29/0009; B01D 29/035; B01D 29/071; B01D 29/072; B01D 27/00; B01D 29/56; B01D 29/58; B01D 35/30; B01D 35/306; B01D 2201/301; B01D 2201/302; B01D 35/301; B01D 2201/307; B01D 35/02; B01D 35/027; B01D 27/146; B01D 27/144; B01D 29/0047; B01D 29/0052; B01D 29/0054; B01D 29/0059
USPC .......... 210/497.01, 314, 315, 335, 337, 338, 210/342, 352, 440–444, 446, 455, 458, 210/484, 489, 222
See application file for complete search history.

(56) References Cited

U.S. PATENT DOCUMENTS

| | | | | |
|---|---|---|---|---|
| 3,773,180 | A * | 11/1973 | Harrison | B01D 29/11 210/315 |
| 4,642,183 | A * | 2/1987 | Hebert | B01D 35/06 210/232 |
| 4,735,716 | A | 4/1988 | Petrucci et al. | |
| 7,087,166 | B1 * | 8/2006 | Sudo | B01D 29/58 210/232 |
| 7,717,026 | B1 | 5/2010 | Lassota | |
| 9,598,230 | B2 | 3/2017 | Schmed et al. | |
| 2003/0145736 | A1 | 8/2003 | Green | |
| 2007/0039476 | A1 | 2/2007 | Kodden | |
| 2008/0038441 | A1 | 2/2008 | Kirschner | |
| 2013/0133522 | A1 | 5/2013 | Denisart et al. | |
| 2014/0161937 | A1 | 6/2014 | Rondelli | |
| 2015/0014250 | A1 | 1/2015 | Volker | |
| 2016/0022089 | A1 * | 1/2016 | Moretto | A47J 31/462 210/236 |
| 2016/0270416 | A1 | 9/2016 | Corey | |
| 2019/0343321 | A1 | 11/2019 | Gussmann et al. | |

FOREIGN PATENT DOCUMENTS

| | | |
|---|---|---|
| CN | 101778587 A | 7/2010 |
| CN | 101862120 A | 10/2010 |
| CN | 202918964 U | 5/2013 |
| CN | 103582601 A | 2/2014 |
| CN | 103917634 A | 7/2014 |
| CN | 104679042 A | 6/2015 |
| CN | 105725808 A | 7/2016 |
| DE | 6939904 U | 3/1970 |
| DE | 6607066 U | 1/1971 |
| DE | 2 341 187 | 2/1974 |
| DE | 3200440 A1 | 7/1983 |
| DE | 100 22 538 A1 | 11/2001 |
| DE | 10 2010 004 729 A1 | 7/2011 |
| DE | 10 2010 012 788 A1 | 9/2011 |
| DE | 10 2010 048 517 A1 | 4/2012 |
| DE | 202012007498 U1 | 10/2012 |
| DE | 10 2004 002 005 A1 | 8/2015 |
| EP | 1 593328 A2 | 11/2005 |
| EP | 2 139 791 B1 | 6/2012 |
| EP | 2 467 332 B1 | 5/2013 |
| EP | 3157839 B1 | 10/2018 |
| GB | 1 402 799 | 8/1975 |
| GB | 2505041 A | 2/2014 |
| JP | S 49-52090 A | 5/1974 |
| JP | 60-106551 U | 7/1985 |
| JP | 62-211799 A | 9/1987 |
| JP | 2005-187076 A | 7/2005 |
| JP | 2005-528177 A | 9/2005 |
| JP | 2008-035707 A | 2/2008 |
| JP | 2009-508547 A | 3/2009 |
| KR | 10-20150077844 | 7/2015 |
| WO | WO 2005/107540 A1 | 11/2005 |
| WO | WO 2009/017927 A1 | 2/2009 |
| WO | WO 2011/097866 A1 | 8/2011 |
| WO | WO 2015/092766 A1 | 6/2015 |
| WO | WO 2018/011020 A1 | 1/2018 |

OTHER PUBLICATIONS

Taiwan Office Action and English Translation for Taiwan Patent application No. TW 23767315, dated Dec. 14, 2020, 11 pgs.
Korean Office Action and English Translation for Korean Patent application No. KR 10-2019-7023874, dated Sep. 30, 2021, pp. 1-7, Korean Patent Office, Seoul, Korea.
Japanese Office Action and English Translation for Japanese Patent application No. JP 2019-544903, dated Apr. 13, 2021, pp. 1-17.
Korean Office Action and English Translation for Korean Patent application No. KR 10-2019-7023874, dated Apr. 20, 2021, pp. 1-6.
Korean Office Action with English translation, issued in KR Patent Application No. 10-2019-7003704, dated Aug. 31, 2021, pp. 1-6, Korean Patent Office, Seoul, Korea.
Second Chinese Office Action with English translation for Chinese patent Application No. 201780055490.7, dated Mar. 12, 2021, pp. 1-13.
We, He, "Bee breading and utilization", Central Plains Farmers Press, Zhengzhou, China Apr. 2013, first edition, pp. 1-4.
Wei, Guo, "Driver of special equipment running from wheel to wheel security Technology questions and answers," China Railway Press, Beijing, China 2004, pp. 1-5.
Xu, Zhiyi, "Mechatronics Practical Technology", Shanghai Science and Technology Literature Press, Shanghai, China, Apr. 1995, first edition, pp. 1-3.
Yu, Yongqing et al., "Economical drip irrigation technology 100 ask", Zhejiang Science and Technology Publishing House, Hangzhou, China, Sep. 2011, first edition, pp. 1-8.
English translation of International Search Report, issued in International Application No. PCT/EP2017/066649, dated Oct. 4, 2017, pp. 1-2, European Patent Office, Rijswiik, Netherlands.
Notice of Reasons for Refusal with English translation, issued in JP Application No. 2019-501943, dated Jul. 21, 2020, pp. 1-8, Japanese Patent Office, Tokyo, Japan.
Taiwanese Office Action with English translation, for Taiwan Patent Application No. TW23767315, dated Dec. 14, 2020, pp. in 1-11, Taiwan Intellectual Property Office, Taipei, Taiwan.
Chinese Office Action with English Translation for Chinese Patent application No. 201880012751.1 dated Jun. 16, 2021, pp. 1-12, China National Intellectual Property Administration, Beijing, People's Republic of China.
Chinese Office Action with English Translation for Chinese Patent application No. 201780055490.7 dated Sep. 2, 2021, pp. 1-24, China National Intellectual Property Administration, Beijing, People's Republic of China.
Chinese Office Action with English Translation for Chinese Patent application No. 201880012751.1 dated Dec. 10, 2021, pp. 1-15, China National Intellectual Property Administration, Beijing, People's Republic of China.
Taiwanese Office Action with English translation, issued Taiwan Patent Application No. 10820238720, dated Mar. 19, 2019, pp. in 1-14, Taiwan Intellectual Property Office, Taipei, Taiwan.
Korean Office Action with English translation, issued in KR Patent Application No. 10-2019-7003704, dated Feb. 24, 2021, pp. 1-5, Korean Patent Office, Seoul, Korea.

(56) References Cited

OTHER PUBLICATIONS

Non-final U.S. Office Action, issued in U.S. Appl. No. 16/316,072, dated May 17, 2021, pp. 1-16, United States Patent and Trademark Office, Alexandria, Virginia.
Final U.S. Office Action, issued in U.S. Appl. No. 16/316,072, dated Aug. 20, 2021, pp. 1-20, United States Patent and Trademark Office, Alexandria, Virginia.
U.S. Restriction Requirement, issued in U.S. Appl. No. 16/316,072, dated Dec. 23, 2020, pp. 1-8, United States Patent and Trademark Office, Alexandria, Virginia.
U.S. Restriction Requirement, issued in U.S. Appl. No. 16/316,072, dated Oct. 2, 2020, pp. 1-6, United States Patent and Trademark Office, Alexandria, Virginia.
Qinfang Chai, "Service Management for Cruise Leisure and Entertainment," Dalian: Dalian Maritime University Press, Mar. 2016, first edition with English Translation.

* cited by examiner

FILTER CAPSULE FOR SECONDARY FILTRATION OF COFFEE AND USE THEREOF

CROSS-REFERENCE TO RELATED APPLICATIONS

This application is a 371 nationalization of international patent application PCT/EP2018/053765 filed Feb. 15, 2018, which claims priority under 35 USC § 119 to German patent application 10 2017 202 685.5 filed Feb. 20, 2017. The entire contents of each of the above-identified applications are hereby incorporated by reference.

DETAILED DESCRIPTION

Figure 1:
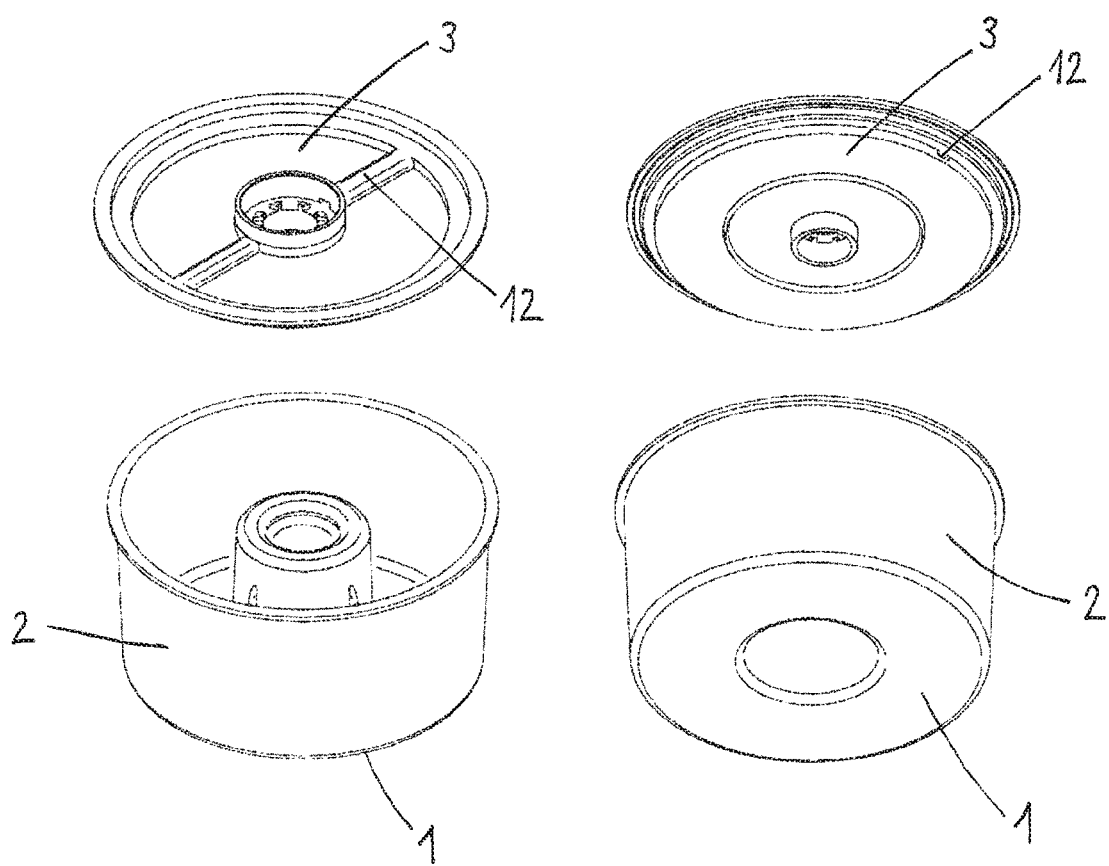
FIG. 1 shows parts of a housing of a filter capsule according to the invention.

A filter capsule for secondary filtration of extracted coffee is provided, which is characterised in that it comprises a housing and at least one filter element or consists thereof. The housing comprises a bottom, at least one side wall and at least one cover or consists thereof, the at least one filter element being disposed in an interior space of the housing. It is possible, with the filter capsule according to the invention, to subject coffee extracted on a brewing strainer to a secondary filtration so that suspended particles and emulsified oils of a specific size are separated from the coffee by the filter element of the filter capsule and a new type of coffee is produced. The use of the filter capsule according to the invention for secondary filtration of coffee is therefore proposed.

Coffee machines for the preparation of pressure-extracted coffee specialities (e.g. espresso or cappuccino) generally use brewing systems in which the coffee drink is brewed under pressure (approx. 4-16 bar). For this purpose, brewing strainers are used which are automatically cleanable and avoid clogging of the brewing strainers by deposits of components of the coffee bean (e.g. insoluble components of the ground coffee beans and coffee oils) during operation. Clogging of the brewing strainers is generally achieved by relatively large strainer apertures (i.e. wide-mesh strainer holes). For specific coffee specialities, such as espresso and cappuccino, particles which hereby pass through the relatively coarse strainer holes, are in fact desired. These are jointly responsible for the particular flavour of these coffee specialities.

In addition, when pressure-brewing these coffee specialities, a so-called "cream" is produced by pressure decrease at the brewing strainer, which is composed mainly also of emulsified coffee oils but also comprises particles and partially expanded $CO_2$. The "cream" is likewise desired in the case of these coffee specialities since it contributes to the appearance or to the flavour.

Standard filter coffee has, in contrast, virtually no particles and also no "cream". The reason for this is that standard filter coffee is generally brewed without applied pressure, i.e. the brewing pressure corresponds generally only to the hydrostatic pressure of the water column above the filter base. At least, in the production of standard filter coffee, no extraction pressures, such as in the production of espresso (approx. 4-16 bar) are achieved. The consequence of this is that the production of standard filter coffee is associated with long brewing times. Since in addition significantly finer (i.e. narrower-mesh) strainers are used during production thereof (pore diameter in the range of 1 to 50 µm), the strainer bases of the strainers often have a fairly large surface area. This prevents the extraction time being unnecessarily prolonged. Often, the strainers used here are produced from paper and/or metal.

Starting herefrom, it was the object of the present invention to provide a device with which it is possible, optionally in cooperation with coffee machines for the preparation of (pressure)-extracted coffee specialities, to provide an extracted coffee with a low content of dispersed particles.

According to the invention, a filter capsule for secondary filtration of extracted, preferably pressure-extracted, coffee is provided, which is characterised in that it comprises a housing and at least one filter element or consists thereof. The housing comprises a bottom, at least one side wall and at least one cover or consists thereof and the at least one filter element is disposed in an interior space of the housing.

By means of the filter element in the filter capsule, a filtration process can take place in the filter capsule according to the invention, which process is subsequent to a brewing process of coffee under pressure. By means of the filter element in the filter capsule, the finest components, i.e. suspended particles situated in the (pressure)-extracted coffee (e.g. sediments and emulsified coffee oils) can be extracted from the pressure-extracted coffee. By filtering of the coffee oils or by the filtration process per se, a possibly resulting "cream" is filtered off or destroyed. By filtering the (pressure)-extracted coffee through the filter element of the filter capsule, the coffee drink hence obtains a different taste and, because of the lack of the finest, dispersed components and also of the "cream", a significantly different appearance. Consequently, a crucial advantage of the filter capsule according to the invention is that a coffee product which differs from standard (pressure)-brewed coffee can be produced. The coffee product is flavour-wise close to or even better than standard filter coffee and can also be provided in small quantities (e.g. cup-wise) at a speed known from pressure-extracted coffee machines.

If the filter capsule according to the invention is used together with a pressure-extracting coffee machine, both standard pressure-extracted coffee products and a coffee product which is very similar as far as identical to a standard filter coffee can be provided. As a result, the user of the coffee machine can be offered different taste experiences in cup volumes in a rapid manner.

A further advantage is that the filter capsule is economically producible and simple to handle. For example, a receiving region can be provided in a coffee machine, in which the filter capsule can be attached to or connected to the coffee machine in a simple manner and also can be removed again from the coffee machine in a simple manner.

Receiving regions, as are already known from coffee machines, in which capsules filled with coffee are attached are hereby conceivable.

The filter element of the filter capsule can comprise at least one filter which has preferably a maximum pore size of 80 μm and preferably has a thickness of 0.1 mm to 10 mm. The filter element can comprise at least one fine filter which preferably has a maximum pore size of 25 μm and, particularly preferably, a thickness of 0.1 mm to 10 mm. The filter element can comprise at least one ultrafine filter which preferably has a maximum pore size of 10 μm and, particularly preferably, has a thickness of 0.1 mm to 10 mm. The filter element can also comprise at least one (e.g. abovementioned) filter, at least one fine filter and at least one ultrafine filter or consist thereof. For particular preference, the at least one fine filter is disposed downstream of the filter and the at least one ultrafine filter downstream of the fine filter.

It is preferred that the maximum pore size (mesh) of the fine filter is smaller than that of the filter and the maximum pore size of the ultrafine filter is smaller than that of the fine filter. The fitting of the filter element with a fine filter and/or ultrafine filter has the advantage that smaller particles can be removed from the coffee in stages. In addition, with the resulting multilayer aspect of the filter element, a significantly higher capacity of the filter element can be achieved than if only one filter, fine filter or ultrafine filter is used. The filter surface which is available is therefore optimally exploited.

The maximum pore size of an element (e.g. of the filter element or of the filter, of the fine filter and of the ultrafine filter and also of the brewing strainer) can be determined simply by a dispersion of particles of a known size distribution being flowed through the element and subsequently the size distribution of the particles on the side of the entrance of the dispersion and/or on the side of the outlet of the dispersion being determined via a microscopic method.

The filter element can have a length, a width and/or a diameter in the range of 1 to 10 cm, preferably 2 to 9 cm, particularly preferably 3 to 8 cm, very particularly preferably 4 to 7 cm, in particular 5 to 6 cm.

The filter element can have a height in a range of 1 to 14 cm, preferably 2 to 12 cm, particularly preferably 3 to 10 cm, very particularly preferably 4 to 8 cm, in particular 5 to 6 cm. The size scaling of the filter element, which correlates with the range of the filter, can be effected via the height of the filter element, i.e. the width and length of the filter element can remain unchanged. In the case of the housing of the filter capsule, correspondingly only the length of the at least one side wall need be adjusted, which has the advantage that the base and the cover, with all the components thereof, can remain unchanged.

The filter element, preferably at least one filter, at least one fine filter and/or at least one ultrafine filter of the filter element can comprise
  i) paper; and/or
  ii) plastic material; and/or
  iii) metal;
or consist thereof. For the following reason, paper and/or plastic material is preferred: the filter element of the filter capsule is subjected to wear and tear by blocking of the pores of the filter element with coffee particles which is made perceptible by a slowly rising flow pressure in front of the filter element. The blocking process can only be reversed with difficulty or not at all. In other words, the filter element can be rinsed free backwards either only with difficulty or no longer at all and must therefore be exchanged regularly after a specific number of coffee preparations. Paper and/or plastic material can be used more economically in the filter capsule and hence represent an economic advantage for a producer and a user of the filter capsule. Paper and/or readily biodegradable plastic material are particularly preferred since these provide low environmental impact and hence also have an ecological advantage.

The filter element, preferably at least one filter, at least one fine filter and/or at least one ultrafine filter of the filter element, can essentially be configured in the form of a straight or diagonal cylinder. Optionally, the cylinder has a straight or diagonal cylindrical recess in the centre of the cylinder. The cylinder preferably has a base, provided optionally with a hole in the centre, which is selected from the group consisting of circular base, semi-circular base, sickle-shaped base, elliptical base and base with at least two corners. A circular base is particularly preferred.

The filter element, preferably at least one filter, at least one fine filter and/or at least one ultrafine filter of the filter element, can, by fluid, preferably by an aqueous solution, particularly preferably by coffee,
  i) be subjectable radially to a flow, preferably can be subjectable to a flow of fluid coming upstream radially in the direction towards an axis of the cylinder and/or can be subjectable to a flow of fluid coming downstream radially in the direction away from an axis of the cylinder; and/or
  ii) be subjectable to a flow axially, preferably can be subjectable to a flow of fluid coming upstream in the direction along an axis of the cylinder from an upper side of the filter element to a lower side of the filter element and/or can be subjectable to a flow of fluid coming downstream in the direction along an axis of the cylinder from a lower side of the filter element to an upper side of the filter element.

The radial inflow has the advantage that the filter element, in the case of a specific strainer surface area, has a smaller maximum spatial extension than in the case of the axial inflow. Furthermore, in a simple manner, the fluid inflow and fluid outflow of the filter capsule can hence be achieved on (only) one specific side (e.g. in the cover of the filter capsule). It is advantageous if the narrow mesh of the strainers which are used increases in the flow direction, i.e. the fluid flows for example firstly through a filter (outer casing of the cylinder), then through a fine filter (central casing of the cylinder) and subsequently through an ultrafine filter (inner casing of the cylinder). Here, the radial inflow has the advantage that it is more economical and ecological, in the case of comparable filtration quality, than the axial inflow since the surface area of the ultrafine filter is smaller than the surface area of the fine filter and the surface area of the fine filter is smaller than the surface area of the filter.

The bottom of the filter capsule can have a base with a length, a width and/or a diameter which is greater than the length, the width and/or the diameter of the base of the filter element, preferably 0.01 to 5 mm, particularly preferably 0.05 to 4 mm, very particularly preferably 0.1 to 3 mm, in particular 0.2 to 2 mm, greater. Optionally, the length, width and/or the diameter of the cover is greater than of the bottom.

The bottom of the filter capsule can have, on a side orientated towards the at least one filter element, at least one raised portion, preferably at least one circular raised portion, which extends in the direction of the filter element, preferably extends in the direction of an ultrafine filter of the filter element, and closes the space between bottom and filter element in a liquid-impermeable manner.

The raised portion has the effect that liquid flowing into the filter capsule (through an inflow) passes through the filter element and finally leaves the filter capsule (through an outflow), i.e. does not run past the filter element. The raised portion has hence the function of a sealing element.

The bottom of the filter capsule can have a thickness in the range of 0.1 to 2 mm, preferably 0.2 to 1.5 mm, particularly preferably 0.3 to 1.0 mm, in particular 0.4 to 0.5 mm.

The bottom of the filter capsule can comprise an elastic region or consist thereof. Preferably, the elasticity of the elastic region is produced by a specific thickness, a specific geometry (e.g. bellows) and/or a specific material. The specific material is selected particularly preferably from the group consisting of elastomers and thermoplastics. In particular, the material is selected from the group consisting of silicone, rubber, polypropylene, polyethylene, polystyrene and mixtures hereof.

If the bottom has an elastic configuration at least in regions (e.g. by means of an elastic material or a low thickness of the bottom), bulging of the bottom can take place as a result of high pressure in the interior of the filter capsule, liquid being able to flow past the filter element ("bypass"). Destruction of the filter capsule by high pressure is consequently avoided. Also sudden blockage of the filter element for any unforeseeable reasons (e.g. a defect in the brewing strainer upstream of the filter capsule) does not lead to a high pressure-caused destruction of the filter capsule. It can be detected by the result in the cup that the filter is no longer functioning since then standard pressure-brewed coffee is found in the cup. Furthermore, the bulging of the bottom can also produce a signal in a pressure sensor which is applied on the bottom of the filter capsule. Hence, information that a high pressure prevails in the filter capsule and that this must be exchanged can be processed and output also by this route to a coffee machine which has the filter capsule and the pressure sensor.

The bottom of the filter capsule can have a depression which extends in the direction of the cover, preferably at least 25% of the height of the at least one side wall, particularly preferably at least 50% of the height of the at least one side wall, very particularly preferably at least 75% of the height of the at least one side wall, in particular at least 90% of the height of the at least one side wall.

The depression of the bottom can be disposed preferably in a cylindrical recess of the filter element.

The depression of the bottom can comprise at least one rib which extends in the direction of the at least one side wall, preferably at least two ribs which extend in the direction of the at least one side wall, particularly preferably at least four ribs which extend in the direction of the at least one side wall. For very particular preference, respectively two ribs are disposed situated opposite each other. In particular, the ribs extend along the depression of the bottom in the direction of the cover, optionally over a length which is at least 50% of the length of the at least one side wall. The rib or plurality of ribs have the advantage that the filter element is orientated, fixed and/or centred in the filter capsule or in the housing of the filter capsule.

The depression of the bottom can comprise a base groove which is disposed preferably in a base of the depression which is disposed parallel to the cover, is disposed particularly preferably concentrically about a central axis of a base of the cover. The base groove can serve for receiving a projection of an adapter capsule provided for receiving the filter capsule and hence for fixing and/or centring the filter capsule in the adapter capsule.

The depression of the bottom can comprise a side surface groove which is disposed preferably in a side surface of the depression which is disposed essentially perpendicular to the cover, is disposed particularly preferably concentrically about a central axis of a base of the cover. The side surface groove can serve for receiving a projection of an adapter capsule provided for receiving the filter capsule and hence for fixing and/or centring the filter capsule in the adapter capsule.

The at least one side wall of the filter capsule can have a height which is greater than the height of the filter element, preferably 0.01 to 5 mm, particularly preferably 0.05 to 4 mm, very particularly preferably 0.1 to 3 mm, in particular 0.2 to 2 mm, greater.

The at least one side wall of the filter capsule can be connected reversibly to the cover, preferably via a form-fit and/or frictional connection, particularly preferably via a screw connection or clamped connection (reusable solution). The advantage of this embodiment is that the filter capsule can be opened and closed by the user in order to exchange the filter element.

The at least one side wall of the filter capsule can be connected irreversibly to the cover, preferably via an integral connection, particularly preferably via a welded joint or adhesive joint (single-use solution). The advantage of this embodiment is that, in contrast to the reusable solution, no problems can arise about the seal of the filter capsule at the interface between the cover and the at least one side wall.

The at least one side wall of the filter capsule can have a thickness in the range of 0.1 to 2 mm, preferably 0.2 to 1.5 mm, particularly preferably 0.3 to 1.0 mm, in particular 0.4 to 0.5 mm.

The side wall can comprise at least one rib which extends in the direction of the filter element, preferably at least two ribs which extend in the direction of the filter element, particularly preferably at least four ribs which extend in the direction of the filter element. For very particular preference, respectively two ribs are disposed situated opposite each other. In particular, the ribs extend along the at least one side wall in the direction of the cover, optionally over a length which is at least 50% of the length of the at least one side wall. The rib or plurality of ribs have the advantage that the filter element is orientated, fixed and/or centred in the filter capsule or in the housing of the filter capsule.

The at least one side wall of the filter capsule can comprise an elastic region or consist thereof. Preferably, the elasticity of the elastic region is produced by a specific thickness, a specific geometry (e.g. bellows) and/or a specific material. The specific material is selected particularly preferably from the group consisting of elastomers and thermoplastics. In particular, the material is selected from the group consisting of silicone, rubber, polypropylene, polyethylene, polystyrene and mixtures hereof.

If the at least one side wall has an elastic configuration at least in regions (e.g. by of an elastic material or a low thickness of the bottom), bulging of the at least one side wall can take place as a result of high pressure in the interior of the filter capsule. This bulging can produce a signal in a pressure sensor which is applied on the at least one side wall of the filter capsule. Hence, a coffee machine which has the filter capsule and the pressure sensor can process and output the information that a high pressure prevails in the filter capsule and that this must be exchanged.

The cover of the filter capsule can have a base with a length, a width and/or a diameter which is greater than the length, the width and/or the diameter of the base of the filter element, preferably 0.01 to 5 mm, particularly preferably 0.05 to 4 mm, very particularly preferably 0.1 to 3 mm, in particular 0.2 to 2 mm, greater. Optionally, the length, width and/or the diameter of the cover is greater than the length, width and/or the diameter of the bottom.

The cover of the filter capsule can have at least one through fluid inlet (inlet of liquid from the inflow of a coffee machine) which is disposed preferably adjacent to a central axis of a base of the cover and, particularly preferably, comprises a membrane for avoiding dripping of liquid out of the filter capsule. This has the effect that the filter capsule has a central or coaxial inlet connection to a coffee machine which enables use of the filter independently of direction.

The cover of the filter capsule can have at least one through fluid outlet (outlet of liquid to the outflow of a coffee machine) which is disposed preferably along a central axis of a base of the cover and, particularly preferably, comprises a membrane for avoiding dripping of liquid out of the filter capsule. This has the effect that the filter capsule has a central or coaxial outlet connection to a coffee machine which enables use of the filter independently of direction.

The cover of the filter capsule can have, on a side orientated away from the at least one filter element, at least one, preferably at least two, particularly preferably at least four, in particular at least eight, spacers which are optionally monolithic with the cover. The spacer or spacers improve the stability of the fluidic connection of the filter capsule to an outflow for a coffee machine.

The cover of the filter capsule can have, on a side orientated towards the at least one filter element, at least one, preferably at least two, particularly preferably at least three, in particular at least four, fluid channels which extend preferably from a centre of a base of the cover in the direction of at least one side wall of the filter capsule, and are closed, particularly preferably, on a side of the filter element orientated towards the cover, optionally via a fluid-channel disc. The presence of a plurality of fluid channels has the advantage that a more defined liquid flow and a more uniform distribution of the coffee flow to the filter element is produced. By means of this measure, the full capacity of the filter element can be exploited and the lifespan of the filter extended.

The cover of the filter capsule can have a predetermined breaking point, preferably a membrane, which is suitable for directing the fluid flow in the filter capsule past the filter element, in the case of high pressure. The advantage of this embodiment is that, in the case of a (massive) high pressure, liquid is conducted through the filter capsule not via the filter element "bypass" and hence a pressure-caused destruction of the filter capsule is avoided.

The cover of the filter capsule can have a sealing foil which closes a fluid inlet and/or fluid outlet of the cover in a fluid-impermeable manner. It is hereby advantageous that, upon removing the filter capsule from a coffee machine, no outflow of liquid (coffee) out of the filter capsule takes place.

The cover of the filter capsule can have, on a side orientated towards the at least one filter element, at least one raised portion, preferably at least one circular raised portion, which extends in the direction of the filter element, preferably extends in the direction of an ultrafine filter of the filter element, and closes the space between cover and filter element in a liquid-impermeable manner. The raised portion has the effect that liquid flowing into the filter capsule (through an inflow) passes through the filter element and finally leaves the filter capsule (through an outflow), i.e. does not run past the filter element. The raised portion has hence the function of a sealing element.

Furthermore, the cover of the filter capsule can comprise a sealing foil. With the sealing foil, a fluid inlet and fluid outlet of the cover can be closed reversibly, which increases the long-term endurance of the filter capsule during storage thereof until use and makes the filter capsule more hygienic. The filter elements can be made available for example in a blister pack.

The filter capsule can comprise a fluid-channel disc which is disposed between the cover and a side of the filter element orientated towards the cover.

The fluid-channel disc can have a through recess, the through recess preferably being disposed essentially in the centre of a base of the fluid-channel disc.

In particular, the fluid-channel disc comprises, at least in regions, and at least parts of a fluid channel. In other words, at least one fluid channel or a plurality of fluid channels can be produced not only or not at all in the cover, but on or in the fluid-channel disc which is disposed between cover and filter element.

The fluid-channel disc can have, on a side orientated towards the at least one filter element, at least one, preferably at least two, particularly preferably at least three, in particular at least four, fluid channels which extend preferably from a centre of a base of the fluid-channel disc in the direction of at least one side wall of the filter capsule, and are closed, particularly preferably, on a side of the filter element orientated towards the cover, optionally via a fluid-channel disc.

The fluid-channel disc can have, on a side orientated towards the at least one filter element, at least one raised portion, preferably at least one circular raised portion, which extends in the direction of the filter element, preferably in the direction of an ultrafine filter of the filter element, and closes the space between fluid-channel disc and filter element in a fluid-impermeable manner. The raised portion has the effect that liquid flowing into the filter capsule (through an inflow) passes through the filter element and finally leaves the filter capsule (through an outflow), i.e. does not run past the filter element. The raised portion has hence the function of a sealing element.

The fluid-channel disc can have a predetermined breaking point, preferably a membrane, which is suitable for directing the fluid flow in the filter capsule past the filter element, in the case of high pressure. The advantage of this embodiment is that, in the case of a (massive) high pressure, liquid is conducted through the filter capsule not via the filter element ("bypass") and hence a pressure-caused destruction of the filter capsule is avoided.

The fluid-channel disc can be disposed parallel to a base of the cover.

The filter capsule can comprise at least one fluid line which, in a region adjacent to a central axis, enters through a base of the cover, through the cover into the filter capsule, extends, on a side of the cover orientated towards the filter element, in the direction of the at least one side wall, extends preferably along the at least one side wall, extends particularly preferably through the at least one filter element, extends very particularly preferably into a region in the centre of the filter capsule and in particular exits out of the filter capsule along the central axis through the base of the cover through the cover.

The filter capsule can comprise a collection strainer which is disposed downstream of the at least one filter element, preferably is integrated in the cover or is disposed between the filter element and the cover (e.g. in the outflow region of the filter capsule), and, particularly preferably, has a pore size in the range of 50 to 500 µm, very particularly preferably, has a thickness of 0.1 mm to 10 mm. In particular, the collection strainer is disposed parallel to a base of the cover. The collection strainer has the effect that macroscopic particles and fibres of the filter element, which can be detached from the filter element during operation of the filter capsule, are collected and retained.

The filter capsule can be connected to an adapter capsule. The adapter capsule is preferably suitable for being connected to a mounting of a coffee machine, preferably via a reversible connection, particularly preferably via a screw closure, hinged closure and/or bayonet closure.

The adapter capsule can comprise at least one magnet, the at least one magnet preferably being suitable for detecting whether the adapter capsule is connected to a filter capsule.

The adapter capsule can comprise at least one fixing element mounted via a spring element, the fixing element preferably being suitable for pressing the filter capsule against a mounting of a coffee machine, in particular by exerting pressure on a depression in the bottom of the housing of the filter element.

In addition, the fixing element can be suitable for producing a fluidic connection in the absence of a filter capsule between an inflow and an outflow of the coffee machine. This ability has the advantage that a cleaning procedure of the coffee machine is simplified since the inflow and the outflow of the coffee machine to the filter capsule is short-circuited and hence can be rinsed without difficulty.

The adapter capsule can comprise at least one base projection which is preferably suitable for engaging in a base groove of a depression of the bottom of the housing.

The adapter capsule can comprise at least one side-surface projection which is preferably suitable for engaging in a side-surface groove of a depression of the bottom of the housing.

Furthermore, the use of the filter capsule according to the invention for secondary filtration of coffee is proposed.

The subject according to the invention is intended to be explained in more detail, with reference to the subsequent Figures, without wishing to restrict said subject to the specific embodiments represented here.

FIG. 1 shows parts of a housing of a filter capsule according to the invention. At the edge of the bottom 1 of the housing, a side wall 2 extends, which has a cylinder-like shape in this case. On the side wall 2, the cover 3 is mounted reversibly or irreversibly. In this embodiment, the cover has at least one fluid channel 12.

Figure 2:
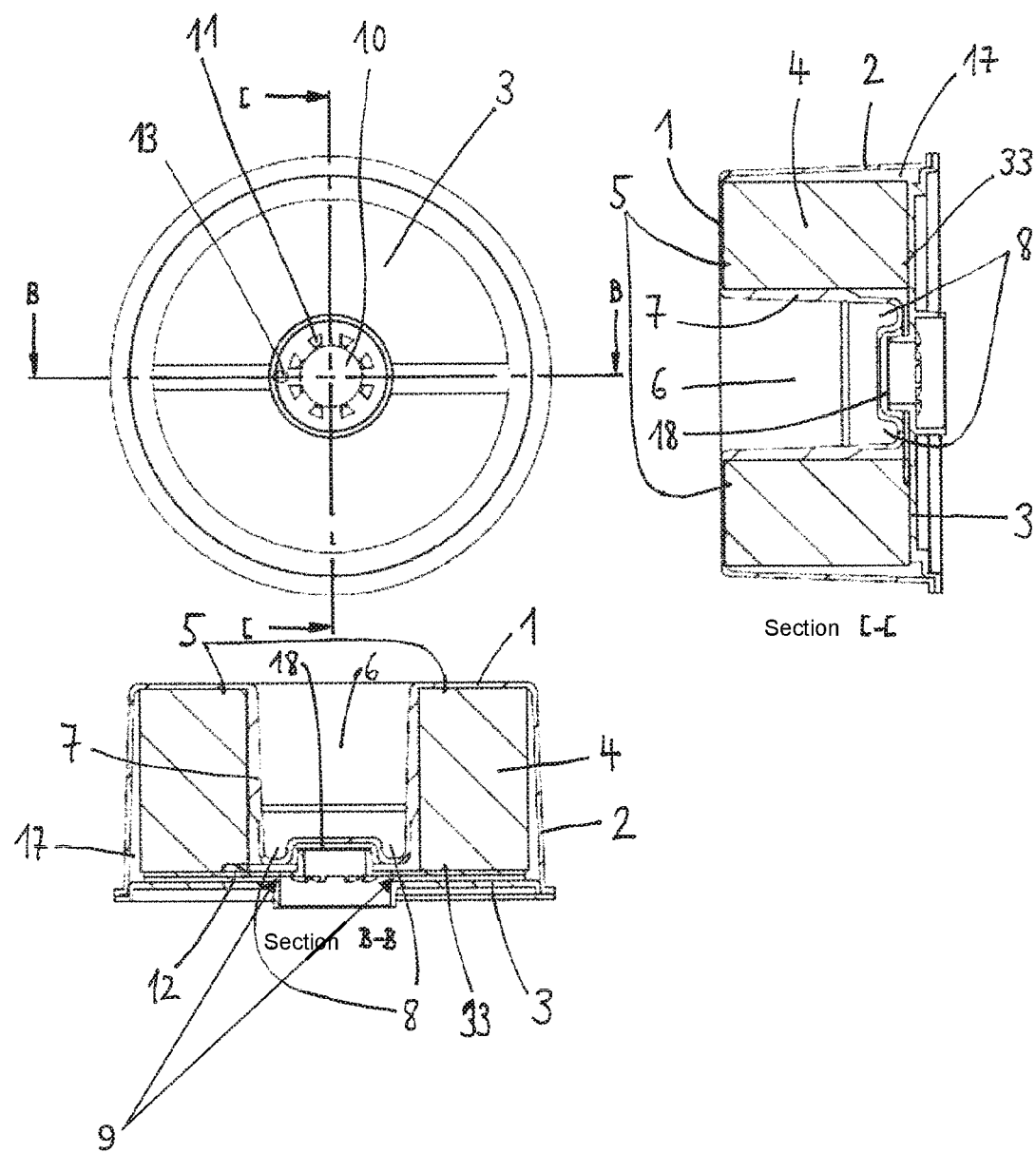
FIG. 2 shows various views on a filter capsule according to the invention.

FIG. 2 shows various views on a filter capsule according to the invention. The bottom 1 is connected monolithically to the side wall 2 and the side wall 2 irreversibly to the cover 3. In the housing formed from bottom 1, side wall 2 and cover 3, the filter element 4 is disposed. A circular raised portion 5 on the bottom 1 and a circular raised portion 33 on the cover 3 prevents liquid in the filter capsule being able to flow past the filter element 4. The bottom 1 has a depression 6 which has a projection 7 in the direction of the filter element 4 and a base groove 8. In addition, a fluid inlet 9, situated in the cover 3, with high pressure safety device, fluid outlet 10 and fluid channel 12 are illustrated. In addition, a fluid channel 17 of the filter capsule which extends along the side wall 2 is illustrated. This filter capsule comprises furthermore a collection strainer 18 in order to collect and retain macroscopic particles and fibres of the filter element 4. In addition, the filter capsule has a predetermined breaking point 13 in the cover (here: a membrane) which breaks with high pressure. Liquid can hence flow past the filter element 4 directly from the inlet to the outlet of the filter capsule ("bypass"). Consequently, any possible destruction of the filter capsule as a result of high pressure can be avoided.

Figure 3:
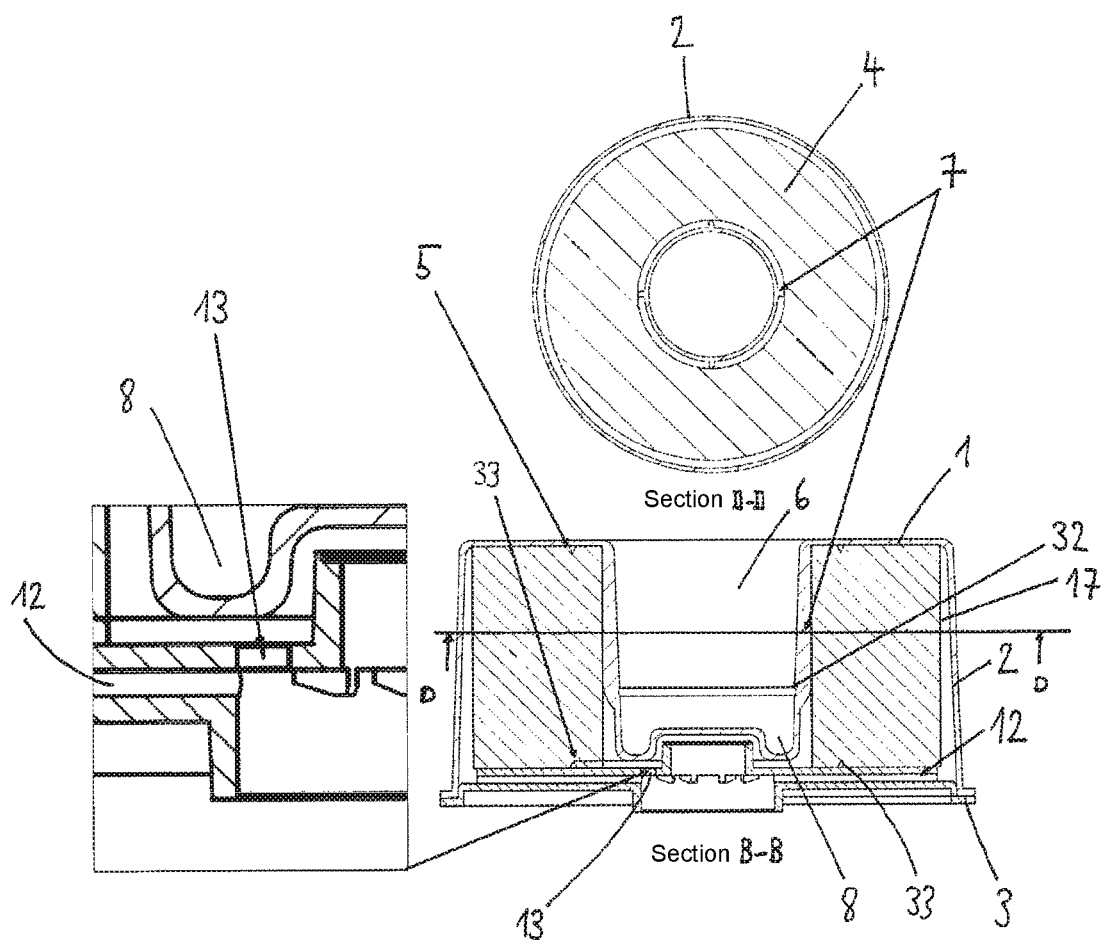
FIG. 3 shows further different views on a filter capsule according to the invention.

FIG. 3 shows further different views on a filter capsule according to the invention. The bottom 1 is connected here also monolithically to the side wall 2 and the side wall 2 irreversibly to the cover 3. In the housing formed from bottom 1, side wall 2 and cover 3, the filter element 4 is disposed. A circular raised portion 5 on the bottom 1 and a circular raised portion 33 on the cover 3 prevents liquid in the filter capsule being able to flow past the filter element 4. The bottom 1 has a depression 6 which has a projection 7 in the direction of the filter element 4 and a base groove 8. In addition, a fluid channel 12 situated in the cover 3 is illustrated. In addition, a fluid channel 17 of the filter capsule which extends along the side wall 2 is illustrated. Furthermore, the arrangement of a side-surface groove 32 of the depression 6 of the bottom 1 of the housing is highlighted, which arrangement facilitates attachment of an adapter capsule to the filter capsule. This filter capsule comprises, furthermore, a predetermined breaking point 13 in the cover (here: a membrane) which breaks at high pressure and does not allow liquid to pass via the filter element 4 but short-circuits inlet and outlet ("bypass"). Consequently any possible destruction of the filter capsule by high pressure can be avoided.

Figure 4:
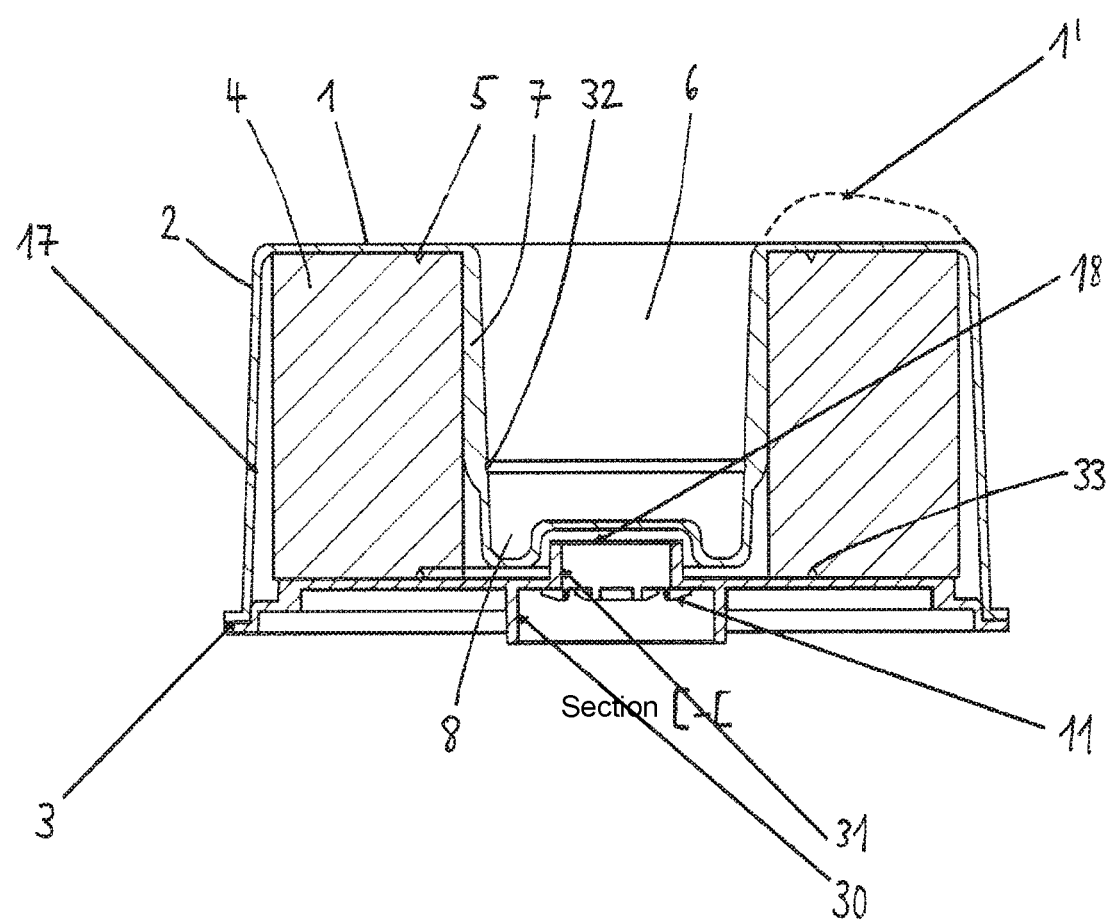
FIG. 4 shows a cross-section of a filter capsule according to the invention.

FIG. 4 shows a cross-section of a filter capsule according to the invention. The bottom 1 is connected here also monolithically to the side wall 2 and the side wall 2 irreversibly to the cover 3. In the housing formed from bottom 1, side wall 2 and cover 3, the filter element 4 is disposed. A circular raised portion 5 on the bottom 1 and a circular raised portion 33 on the cover 3 prevents liquid in the filter capsule being able to flow past the filter element 4. The bottom 1 has a depression 6 which has a projection 7 in the direction of the filter element 4 and a base groove 8. In addition, a fluid channel 17 of the filter capsule which extends along the side wall 2 is illustrated. Furthermore, the arrangement of a side-surface groove 32 of the depression 6 of the bottom 1 of the housing is highlighted, which arrangement facilitates attachment of an adapter capsule to the filter capsule. In addition, a collection strainer 18 is illustrated here in order to collect and retain macroscopic particles and fibres of the filter element 4, and a sealing surface 30 situated in the cover 3 for supply of liquid and a sealing surface 31 situated in the cover 3 for discharge of liquid. The bottom 1 here has a bottom region 1' which has an elastic configuration (elastic material or less thickness). This has the advantage that, in the case of high pressure in the filter capsule, liquid is not retained by the seal of the circular raised portion 5 on the bottom 1 of the housing. Rather, under these conditions, liquid can flow past the filter element 4 ("bypass") and pressure-caused damage to the filter capsule can be avoided.

Figure 5:
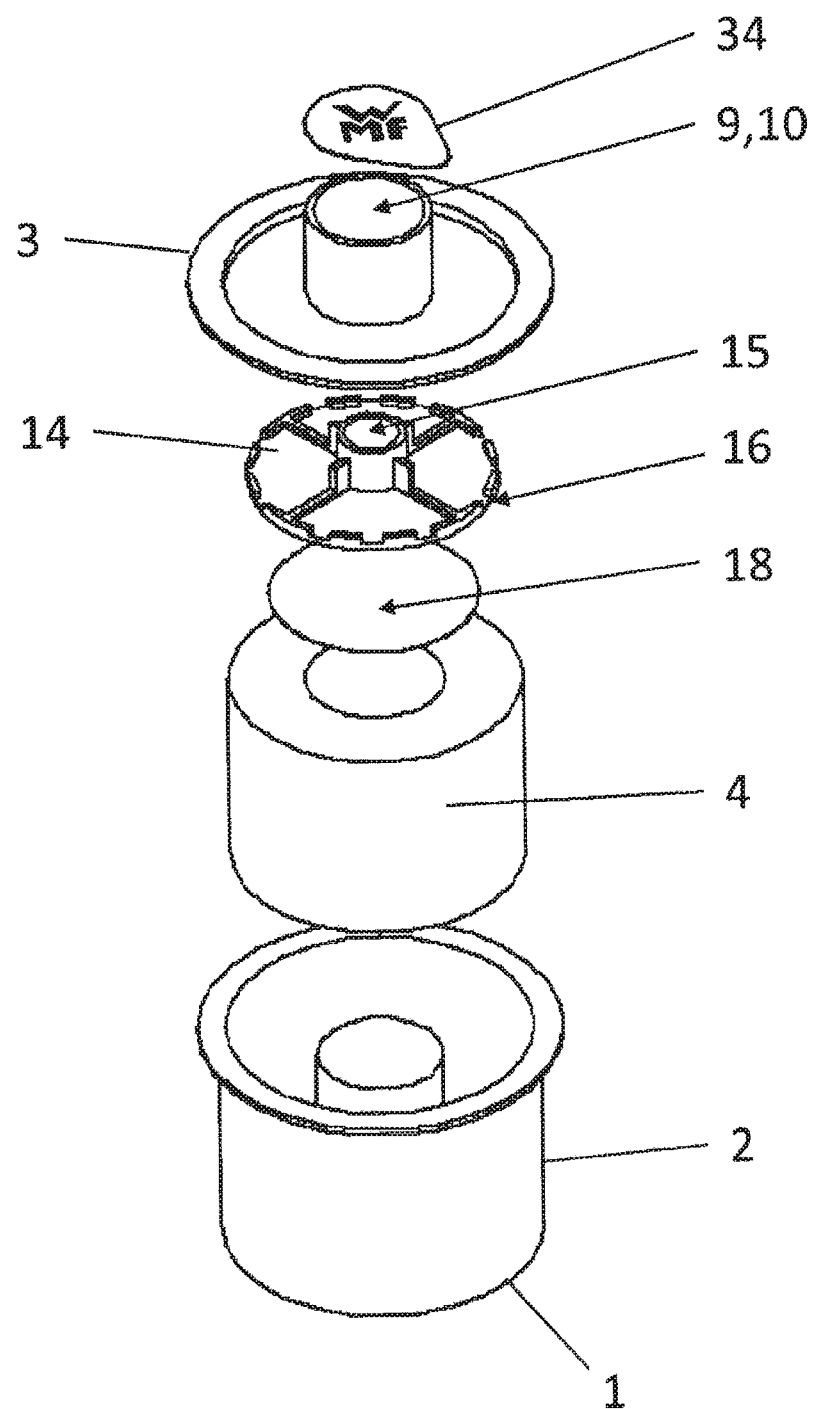
FIG. 5 shows schematically the construction of a filter element according to the invention.

FIG. 5 shows schematically the construction of a filter element according to the invention. The bottom 1 is connected here also monolithically to the side wall 2. A filter element 4 is inserted into the monolithic part made of bottom 1 and side wall 2. A collection strainer 16 is placed here on the filter element 4 in order to collect and retain macroscopic particles and fibres of the filter element 4 during operation of the filter capsule. A fluid-channel disc 14 which has, in the centre thereof, a through recess 15 and comprises at least one fluid channel 16 is placed on the collection strainer 18. The cover 3 which can be connected reversibly or irreversibly to the side wall 2 in order to close the housing is placed on this fluid-channel disc 14. The cover 3 has a fluid inlet 9 and a fluid outlet 10 which can be closed optionally via a sealing foil 34 in order to increase the long-term stability of the filter capsule during storage thereof.

Figure 6:
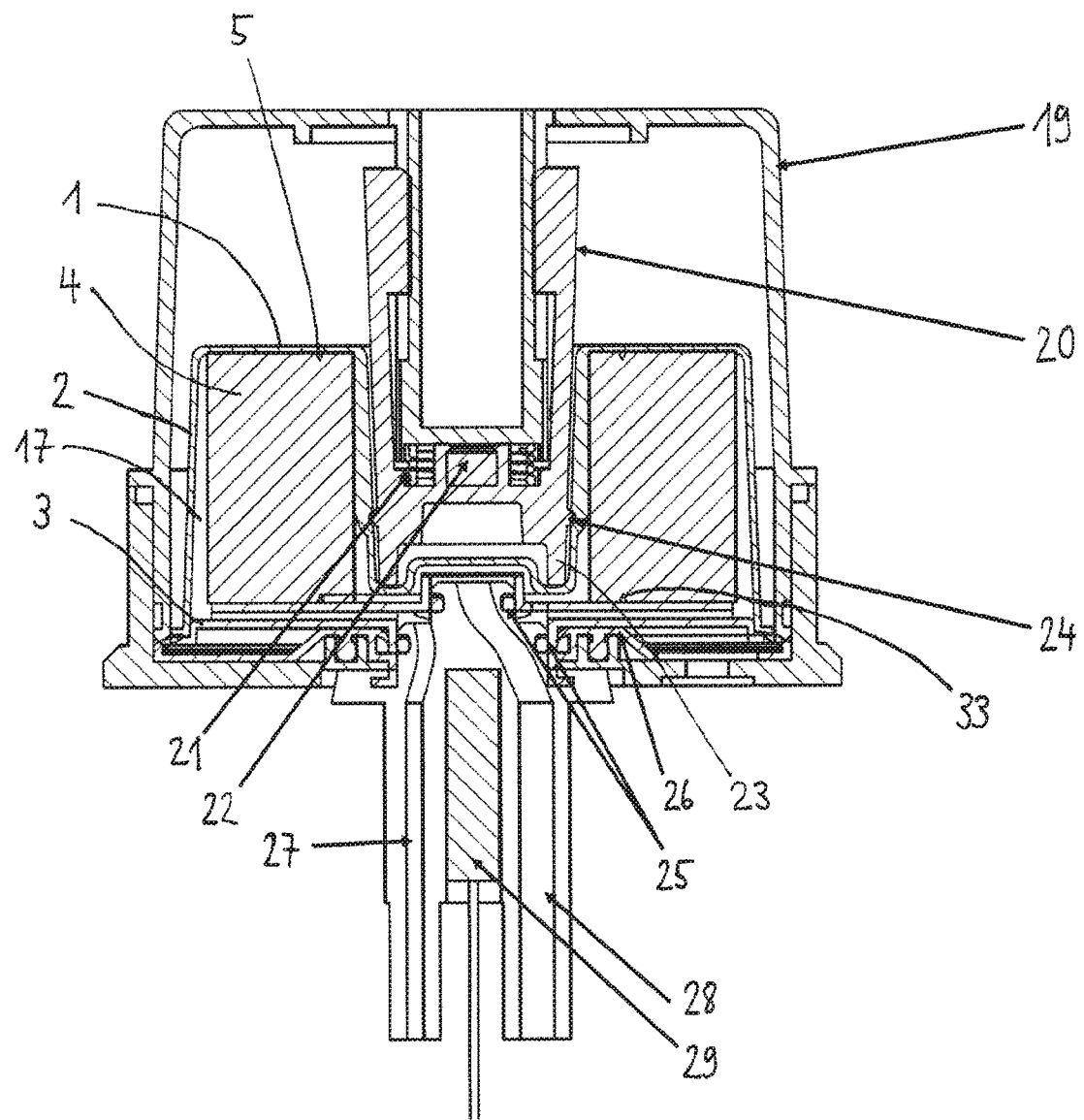
FIG. 6 shows a cross-section of a filter capsule according to the invention which is inserted in an adapter capsule.
Figure 7:
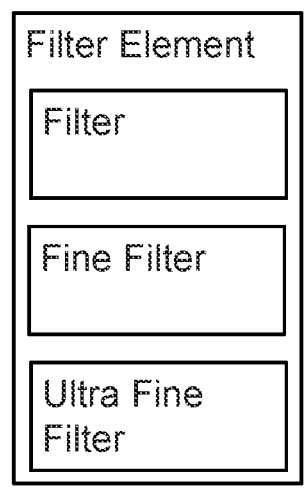
FIG. 7 is a schematic diagram of a filter element comprising a filter, a fine filter and an ultrafine filter, the fine filter disposed downstream of the filter, and the ultrafine filter disposed downstream of the fine filter.

FIG. 6 shows a cross-section of a filter capsule according to the invention which is inserted in an adapter capsule 19. The bottom 1 of the filter capsule is connected monolithically to the side wall 2 and the side wall 2 irreversibly to the cover 3. In the housing formed from bottom 1, side wall 2 and cover 3, the filter element 4 is disposed. A circular raised portion 5 on the bottom 1 and a circular raised portion 33 on the cover 3 prevents liquid in the filter capsule being able to flow past the filter element 4. In a depression on the bottom 1 of the filter capsule, a fixing element 20 of the adapter capsule 19 is disposed, the fixing element 20 being connected in a form-fit to the filter capsule via a side-surface projection 24 of the adapter capsule 19 into a side-surface groove of the depression on the bottom 1 of the filter capsule. A spring element 21 of the adapter capsule 19 exerts a spring pressure on the filter capsule and presses this towards an inflow 27 and an outflow 28 of a coffee machine. A sealing ring 25 and a silicone seal 26 of the adapter capsule 19 ensure that no liquid runs past the filter capsule. The adapter capsule 19 has in addition a magnet 22 with which it can be detected whether a filter capsule is inserted in the adapter capsule 19 or not. The detection can be effected for example via a sensor 29 of the coffee machine.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

REFERENCE NUMBER LIST

1: bottom of the housing
1': elastic bottom of the housing under high pressure in filter capsule (e.g. 0.7 to 1.0 bar in filter capsule)
2: side wall of the housing
3: cover of the housing
4: filter element
5: circular raised portion on the bottom of the housing
6: depression in the bottom of the housing
7: projection of the depression in the bottom of the housing
8: base groove of the depression in the bottom of the housing
9: fluid inlet in the cover
10: fluid outlet in the cover
11: spacer in the cover
12: fluid channel in the cover
13: predetermined breaking point in the cover
14: fluid-channel disc between cover and filter element
15: through recess of the fluid-channel disc
16: fluid channel of the fluid-channel disc
17: fluid channel of the filter capsule
18: collection strainer of the filter capsule
19: adapter capsule
20: fixing element of the adapter capsule
21: spring element of the adapter capsule
22: magnet of the adapter capsule
23: base projection of the adapter capsule
24: side-surface projection of the adapter capsule
25: sealing ring of the adapter capsule (O-ring)
26: silicone seal
27: inflow of the coffee machine
28: outflow of the coffee machine
29: sensor of the coffee machine
30: sealing surface in the cover for supply
31: sealing surface in the cover for discharge
32: side-surface groove of the depression in the bottom of the housing
33: circular raised portion on the cover
34: sealing foil on the cover

The invention claimed is:

1. A coffee filter capsule comprising:
a housing and at least one filter element,
the coffee filter capsule configured to filter pressure-extracted coffee,
the housing comprising a bottom, at least one side wall, and a cover,
wherein the at least one filter element is disposed in an interior space of the housing,
wherein the cover has at least one through fluid inlet which is disposed adjacent to a central axis of a base of the cover,
wherein the cover has at least one through fluid outlet, and
wherein the filter element comprises at least one filter which has a maximum pore size of 80 μm and comprises at least one fine filter which has a maximum pore size of 25 μm,
wherein the at least one fine filter is disposed downstream of the at least one filter, and
wherein the at least one filter and the at least one fine filter are subjectable to a flow radially by fluid
wherein the coffee filter capsule comprises a fluid-channel disc which is disposed between the cover and a side of the filter element orientated towards the cover.

2. The coffee filter capsule of claim 1, wherein the filter element comprises:
at least one fine filter, which has a maximum pore size of 25 μm and/or has a thickness in a range of 0.1 mm to 10 mm; and
at least one ultrafine filter which has a maximum pore size of 10 μm.

3. The coffee filter capsule of claim 2, wherein the filter element comprises the at least one filter, the at least one fine filter and the at least one ultrafine filter, the at least one fine filter being disposed downstream of the filter and the at least one ultrafine filter being disposed downstream of the fine filter.

4. The coffee filter capsule of claim 1, wherein the filter element has:
a width in a range of 1 to 10 cm; or
a height in a range of 1 to 14 cm.

5. The coffee filter capsule of claim 1, wherein the filter element comprises paper, plastic material, or metal.

6. The coffee filter capsule of claim 1, wherein the filter element is essentially configured in a form of a straight or inclined cylinder.

7. The coffee filter capsule of claim 1, wherein the bottom comprises:

a base with a length and a width which is greater than, respectively, a length and a width of a base of the filter element;
   at least one raised portion on a side orientated towards the at least one filter element;
   a thickness in a range of 0.1 to 2 mm; and/or
   an elastic region.

8. The coffee filter capsule of claim 1, wherein the bottom has a depression which extends in the direction of the cover, the depression being disposed in a cylindrical recess of the filter element.

9. The coffee filter capsule of claim 1, wherein the at least one side wall is connected reversibly or irreversibly to the cover, wherein the at least one side wall comprises:
   a height which is greater than the height of the filter element;
   a thickness in a range of 0.1 to 2 mm;
   at least one rib which extends in the direction of the filter element; or
   an elastic region or consists thereof.

10. The coffee filter capsule of claim 1, wherein the cover comprises:
   a base with a length and a width which is greater than, respectively, a length and a width of the base of the filter element;
   the at least one through fluid inlet which is disposed adjacent to the central axis of the base of the cover and comprises a membrane configured to avoid dripping of liquid out of the coffee filter capsule;
   the at least one through fluid outlet which is disposed along the central axis of the base of the cover;
   at least one spacer on a side orientated away from the at least one filter element;
   on a side orientated towards the at least one filter element, at least one fluid channel which extends from a center of the base of the cover in the direction of the at least one side wall of the coffee filter capsule;
   a predetermined breaking point in the form of a membrane which is configured to direct the fluid flow in the coffee filter capsule past the filter element, in the case of high pressure;
   a sealing foil which closes a fluid inlet and/or fluid outlet of the cover in a fluid-impermeable manner; or
   on a side orientated towards the at least one filter element, at least one raised portion which extends in the direction of the filter element and closes a space between cover and filter element in a liquid-impermeable manner.

11. The coffee filter capsule of claim 1, wherein the coffee filter capsule comprises at least one fluid line which, in a region adjacent to the central axis, enters through the base of the cover through the cover into the coffee filter capsule, extends, on a side of the cover orientated towards the filter element, in the direction of the at least one side wall, extends along the at least one side wall, extends through the at least one filter element, extends into a region in the center of the coffee filter capsule and exits out of the coffee filter capsule along the central axis through the base of the cover through the cover.

12. The coffee filter capsule of claim 1, wherein the coffee filter capsule comprises a collection strainer which is disposed downstream of the at least one filter element.

13. The coffee filter capsule of claim 1, wherein the coffee filter capsule is connected to an adapter capsule, the adapter capsule configured to connect to a mount of a coffee machine, the adapter capsule comprising:
   at least one magnet;
   at least one fixing element mounted via a spring element;
   at least one base projection; or
   at least one side-surface projection.

14. The coffee filter capsule of claim 1, wherein the bottom has a depression which extends in the direction of the cover, wherein the depression comprises a base groove or a side surface groove.

15. A coffee filter capsule comprising:
a housing and at least one filter element,
the coffee filter capsule configured for secondary filtration of extracted coffee,
the housing comprising a bottom, at least one side wall, and a cover,
wherein the at least one filter element is disposed in an interior space of the housing,
wherein the cover has at least one through fluid inlet which is disposed adjacent to a central axis of a base of the cover,
wherein the cover has at least one through fluid outlet,
wherein the filter element comprises at least one filter which has a maximum pore size of 80 μm, and
wherein the bottom has a depression which extends in the direction of the cover, wherein the depression comprises a base groove or a side surface groove.

16. A coffee filter capsule comprising:
a housing and at least one filter element,
the coffee filter capsule configured to filter pressure-extracted coffee,
the housing comprising a bottom, at least one side wall, and a cover,
wherein the at least one filter element is disposed in an interior space of the housing,
wherein the cover has at least one through fluid inlet which is disposed adjacent to a central axis of a base of the cover,
wherein the cover has at least one through fluid outlet, and
wherein the filter element comprises at least one filter which has a maximum pore size of 80 μm,
wherein the bottom has a depression which extends in the direction of the cover, the depression being disposed in a cylindrical recess of the filter element.

17. A coffee filter capsule comprising:
a housing and at least one filter element,
the coffee filter capsule configured to filter pressure-extracted coffee,
the housing comprising a bottom, at least one side wall, and a cover,
wherein the at least one filter element is disposed in an interior space of the housing,
wherein the cover has at least one through fluid inlet which is disposed adjacent to a central axis of a base of the cover,
wherein the cover has at least one through fluid outlet, and
wherein the filter element comprises at least one filter which has a maximum pore size of 80 μm,
wherein the cover comprises a predetermined breaking point in the form of a membrane which is configured to direct the fluid flow in the coffee filter capsule past the filter element, in the case of high pressure, or wherein the coffee filter capsule is connected to an adapter capsule, the adapter capsule configured to connect to a mount of a coffee machine, the adapter capsule comprising at least one magnet, at least one fixing element mounted via a spring element, at least one base projection or at least one side-surface projection.

\* \* \* \* \*